ENDLESS TAPE CARTRIDGE AND ACTUATING MECHANISM

Filed Sept. 28, 1959

Inventor
Stuart A. Steelman
by Donald H. Zarley
Attorney

Witness
Edward P. Seeley

United States Patent Office 2,951,654

Patented Sept. 6, 1960

2,951,654

ENDLESS TAPE CARTRIDGE AND ACTUATING MECHANISM

Stuart A. Steelman, 917 17th, West Des Moines, Iowa

Filed Sept. 28, 1959, Ser. No. 842,997

11 Claims. (Cl. 242—55.13)

My invention relates to the control and containment of endless tape reels and more particularly to a cartridge device that will properly contain and control a reel of endless tape therein at all times.

Magazine type cartridges having reels of endless magnetic tape are commonly used in conjunction with play-back instruments as a means of providing background music and the like. The tape is comprised of a light film material which is very sensitive and which, when wound in a continuous reel, is unstable to the extent that the configuration of the reel can be altered or disformed by normal use and handling of the cartridge.

The cartridges are obviously subjected to jarring and abuse during shipping and this condition is aggravated by the fact that all tape reels of the type in question are mounted on a rotatable turntable within the cartridge. Since the tape in the reel always has a portion of its length departing from the circular configuration of the reel to embrace certain functional elements in the cartridge, a jarring action imposed upon the cartridge often results in fouling of the tape and disfiguration of the continuous reel. Even when the cartridge is safely mounted in the play-back instrument, thickness variations in the tape will sometimes cause an individual configuration of the tape to rise to a level above the horizontal position of the rotating reel. The continued rotation of the reel will cause an accumulation of these configurations to depart from the normal plane of the reel. This action will inhibit the departure and reentry of the tape from the inner and outer peripheries, respectively, of the reel, if not completely stopping this operation. The rising of these configurations, as described above, is also related to the phenomenon of each configuration of tape slipping with relation to adjacent configurations to compensate for speed differentials at various points on the radius of the reel.

Therefore, the principal object of my invention is to provide a cartridge device for continuous tape reels which will maintain and control the tape during both the shipping and playing operations.

A further object of my invention is to provide a cartridge device for continuous tape reels which can automatically relinquish some of its control characteristics over the tape upon being inserted into a conventional play-back instrument.

A still further object of my invention is to provide a cartridge device for continuous tape reels which can automatically acquire maximum control over the tape whenever it is disassociated from the play-back instrument.

A still further object of my invention is to provide a cartridge device for continuous tape reels which can effectively control and maintain the tape without impeding, complicating or otherwise interfering with the normal use of the reel.

A still further object of my invention is to provide a cartridge device for continuous tape reels which is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figures 1, 2, 3:
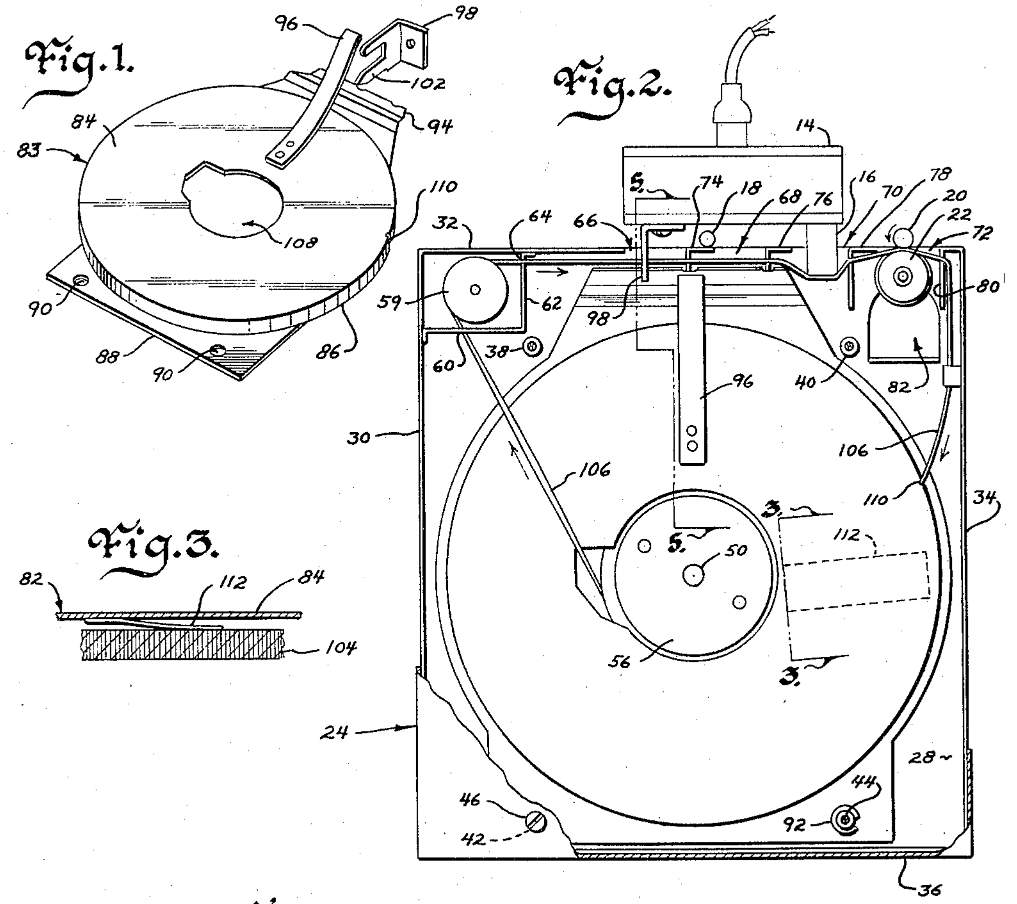
Fig. 1 is a perspective view of my interior lid element and actuating clip element.
Fig. 2 is a plan view of my cartridge device in operating position on a play-back instrument with the exterior lid element partially cut away to more fully illustrate its construction.
Fig. 3 is a sectional view of my device taken on line 3—3 of Fig. 2.

I have used the numeral 10 to designate a conventional tape play-back instrument having a horizontal table surface 12, a control bracket 14, a transducer head 16 to pick up the sound from the moving tape, a stop element 18 to determine the operating position of the cartridge, a powered driving capstan 20 and a pivotal pinch roller 22 which is adapted to hold the tape against the capstan at time for purposes of driving the tape. These elements of themselves do not comprise a part of my invention.

Figure 4:
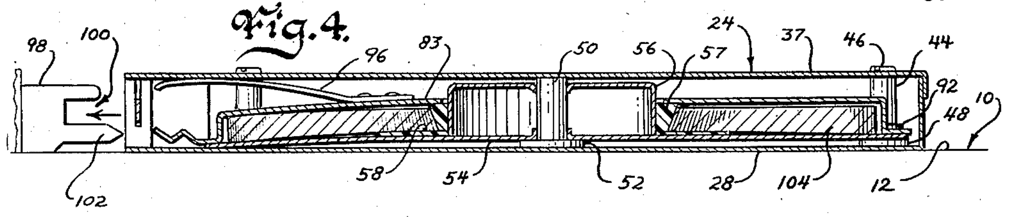
Fig. 4 is a transverse, vertical sectional view of my device as it is being inserted into a play-back instrument.

The numeral 24 designates my cartridge which is comprised of a rectangular container 26 which has a bottom 28, shallow side walls 30, 32, 34 and 36, and exterior lid element 37. Four posts 38, 40, 42 and 44 extend vertically upward from container 26 and terminate in the same plane as the top of the container walls. These posts are adapted to threadably receive screws 46 in their upper ends. Posts 42 and 44 can have a shoulder 48 about their lower portions as shown in Fig. 4. Exterior lid element 37 fits down over the walls of container 26 and is held in position by the screws 46 which penetrate holes in the lid element that register with posts 38, 40, 42 and 44.

A spindle 50 extends vertically upwardly from the bottom center of container 26 and has a height similar to post 38 to 44. A shoulder 52 embraces the lower end of spindle 50. A flexible circular turntable 54 with a center hub 56 is rotatably mounted on spindle 50. Shoulder 52 keeps the horizontal turntable 54 in normal spaced apart relation with the interior surface of the bottom 28 of container 26. A winding drum 57 with a circular horizontal disk 58 on its lower portion rotatably embraces hub 56 and rests on top of turntable 54.

As shown in Fig. 2 a small pulley 59 is rotatably mounted in a horizontal plane on the bottom 28 of container 26 adjacent the point of intersection between walls 30 and 32. A wall section 60 extends inwardly from wall 30 and terminates in wall section 62 which extends perpendicularly toward container wall 32 to enclose pulley 59. A small opening (not shown) in wall section 60 can receive tape therethrough as can notch 64 in wall section 62. Container wall 32 has openings 66, 68, 70 and 72 therein. As shown in Fig. 2, opening 66 is defined by wall 32 and L-shaped post 74; opening 68 is defined by L-shaped posts 74 and 76; opening 70 is defined by L-shaped posts 76 and 78; and opening 72 is defined by L-shaped posts 78 and 80. Opening 82 in the bottom 28 of container 26 is adapted to receive pinch roller 22. L-shaped posts 74, 76, 78 and 80 all have notches 64 in substantial alignment with notch 64 in wall section 62.

The numeral 83 designates my interior lid element which is comprised of light resilient material. Lid element 83 has a circular top portion 84 and a flange 86 extending vertically downwardly from the periphery thereof. A horizontal flange 88 extends away from one side of the lower edge of flange 86 and has holes 90 therein which are adapted to receive posts 42 and 44. Lid element 83 is of sufficient diameter to substantially cover turntable 54 and snap rings 92 are adapted to hold flange 88 in rigid engagement with the shoulders 48 on the bottom portions of posts 42 and 44. A lip 94 extends outwardly and upwardly from the bottom of flange 86 at a position opposite to flange 88, as shown in Fig. 4. A resilient elongated leaf spring member 96 is riveted to the top portion 84 of lid 83 and extends upwardly at an angle therefrom over lip 94. The overall distance between the uppermost portion of spring 96 and the bottom-most portion of lip 94 is greater than the height of container 26.

An L-shaped clip 98 is secured in any convenient fashion to the control bracket 14 on the play-back instrument 10. Clip 98 is so positioned on bracket 14 that it can penetrate into opening 66 in cartridge 24 when the cartridge is in operating or playing position. Clip 98 has a rectangular recess 100 therein with a pointed or beveled finger 102 on the lower edge of the recess. The pointed or beveled end of finger 102 is adapted to engage and force upwardly the lip 94 on lid element 83 as will be seen hereafter.

A reel 104 of continuous tape rests on turntable 54 and normally has a portion 106 of its length extending from its inner perimeter adjacent drum 57 through an opening 108 in the center of interior lid element 83; thence through the opening (not shown) in wall section 60, thence about pulley 59; thence through the aligned notches 64 in wall section 62, and posts 74, 76, 78 and 80; and thence back to the outer periphery of the reel through a slot opening 110 in the flange 86 of interior lid element 83. As shown in Figs. 2 and 3, a resilient rectangular shim element 112 is secured in any convenient fashion to the inside surface of the top portion 84 of lid element 83 to yieldingly bear pressure on the top of tape reel 104.

The normal operation of my device is as follows: When not in operation on a play-back instrument, the component parts of my cartridge 24 assume the general position shown in Fig. 4. The exterior lid of container 26 is rigidly secured to the tops of posts 38, 40, 42 and 44 by screws 46. The exterior lid brings pressure to bear on the spring element 96 and forces the spring downwardly. The spring 96 deflects somewhat but nevertheless forces one edge of interior lid 83 downwardly into actual engagement with the top of tape reel 104. The other edge of lid 83 is firmly held against deflection or displacement by snap rings 92 holding flange 88 of the lid against shoulders 48 around the bottom portions of posts 42 and 44.

The downward deflection of interior lid 83 against tape reel 104 deflects the reel against the turntable 54 and in turn deflects and binds one area of the turntable against the inside bottom 28 of container 26. This action serves at least two functions: It binds the turntable against rotatable movement about spindle 50, and it tends to gently bind reel 104 against the turntable to prevent relative movement therebetween. Thus, normal jarring of the cartridge during shipment will not be sufficient to cause movement of either the turntable 54 or the tape reel 104.

Fig. 4 shows my cartridge 24 about to be moved into operating position on a play-back instrument 10. Usually, a cartridge is slidably directed toward control channel 14 on the instrument 10 by means of certain guide means not shown here. The pinch roll 22 is in a retracted position underneath the top of table 10 at this point. As the beveled finger 102 penetrates the opening 66 in cartridge 24, it engages the lip 94 on interior lid 83 and forces the lip upwardly into recess 100. Stop element 18 stops the sliding action of the cartridge 24 towards the control bracket 14. This leaves the cartridge in the position shown in Fig. 2 with the tape portion 106 passing through the recess 100 in clip 98 and in engagement with transducer head 16. Pinch roll 22 can then be pivoted upwardly through opening 83 in the bottom of the cartridge to bind the tape against the driving capstan 20.

Figure 5:
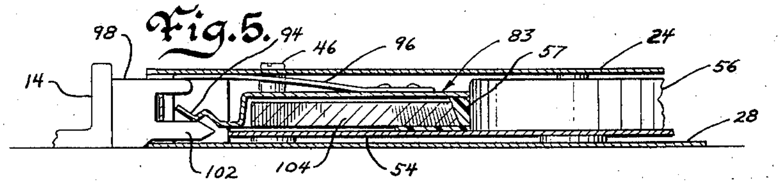
Fig. 5 is a partial sectional view of my device taken on line 5—5 of Fig. 2 and shows my device in operational position upon a play-back instrument.

As shown in Fig. 5, the deflection of lip 94 in an upward direction will cause interior lid 83 to compress spring 96 so that the lid can assume a horizontal position. This action will release pressure on the tape reel 104 and turntable 54 so that the turntable and tape will be free to rotate about spindle 50. The shim element 112 will continue to bring slight pressure to bear on the tape reel 104 to prevent any configurations of the tape from rising above the elevation of the reel. Obviously, when the cartridge 24 is removed away from clip 98, the finger 102 on the clip will relinquish its control over lip 94. Spring 96 will thereupon force lid 83 downwardly to automatically hold the tape reel 104 and turntable 54 in binding inoperative condition as described above.

Therefore, it is seen that my device will accomplish at least all of its stated objectives.

Some changes may be made in the construction and arrangement of my endless tape cartridge and actuating mechanism without departing from the real spirit and purpose of my invention, and it is my intention to cover by my claims, any modified forms of structure or use of mechanical equivalents which may be reasonably included within their scope.

I claim:

1. In an endless tape cartridge, a container having a bottom and side walls, a lid on said container, a resilient turntable rotatably mounted on said container in spaced relation to the bottom thereof, a reel of endless tape on said turntable, and means secured within said container to deflect and bind said reel against said turntable and to deflect and bind said turntable against said container; the bottom of said container underneath said turntable and said reel being closed and of continuous construction.

2. In an endless tape cartridge, a container having a bottom and side walls, a lid on said container, a resilient turntable rotatably mounted on said container, a reel of endless tape on said turntable, and means on said turntable to deflect and bind said reel against said turntable and to deflect and bind said turntable against said container; the bottom of said container underneath said turntable and said reel being closed and of continuous construction.

3. In an endless tape cartridge, a container having a bottom and side walls, a lid on said container, a resilient turntable rotatably mounted on said container in spaced relation to the bottom thereof, a reel of endless tape on said turntable, and a resilient means secured within said container to yieldably deflect and bind said reel against said turntable and to deflect and bind said turntable against said container; the bottom of said container underneath said turntable and said reel being closed and of continuous construction.

4. In an endless tape cartridge, a container having a bottom and side walls, a lid on said container, a turntable rotatably mounted on said container in spaced relation to the bottom thereof, a reel of endless tape on said turntable, a resilient interior lid within said container and mounted in spaced relation over said reel and said turntable, and a resilient means between said lid and said interior lid to normally urge said interior lid into engagement with said reel and said turntable.

5. In an endless tape cartridge, a container having a bottom and side walls, a lid on said container, a turntable rotatably mounted on said container in spaced relation to the bottom thereof, a reel of endless tape on said turntable, a resilient interior lid within said container and mounted in spaced relation over said reel and said turntable, a resilient shim element secured to said interior lid and in engagement with a portion of said reel, and a resilient means between said lid and said interior lid to normally urge said interior lid into engagement with said reel and said turntable.

6. In an endless tape cartridge, a container having a bottom and side walls, a lid on said container, a turntable rotatably mounted on said container in spaced relation to the bottom thereof, a reel of endless tape on said turntable, a resilient interior lid within said container and mounted in spaced relation over said reel and said turntable, said interior lid rigidly secured to said container at one of its edges, a resilient means on said interior lid at a point substantially opposite to the edge secured to said container, said resilient means extending between said interior lid and said lid and being normally compressed to urge said interior lid into engagement with said reel and said turntable.

7. In an endless tape cartridge, a container having a bottom and side walls, a lid on said container, a turntable rotatably mounted on said container in spaced relation to the bottom thereof, a reel of endless tape on said turntable, a resilient interior lid within said container and mounted in spaced relation over said reel and said turntable, said interior lid rigidly secured to said container at one of its edges, a resilient means on said interior lid at a point substantially opposite to the edge secured to said container, said resilient means extending between said interior lid and said lid and being normally compressed to urge said interior lid into engagement with said reel and said turntable; said resilient means being strong enough to deflect said interior lid to deflect and bind said reel against said turntable and to deflect and bind said turntable against the bottom of said container.

8. In combination, a magnetic tape play-back instrument having a clip element thereon, and an endless tape cartridge, comprising, a container having a bottom and side walls, a lid on said container, a turntable rotatably mounted on said container in spaced relation to the bottom thereof, a reel of endless tape on said turntable, a resilient interior lid within said container and mounted in spaced relation over said reel and said turntable, an opening in at least one side of said container, a lip element on said interior lid adjacent said opening, and a resilient means between said lid and said interior lid to normally urge said interior lid into engagement with said reel and said turntable; said clip element penetrating into the opening in said container and engaging said lip element on said interior lid to disengage said interior lid from said reel and said turntable.

9. In an endless tape cartridge, a container having a bottom and side walls, a lid on said container, a turntable rotatably mounted on said container in spaced relation to the bottom thereof, a reel of endless tape on said turntable, a resilient interior lid within said container and mounted in spaced relation over said reel and said turntable, a lip element on said interior lid, a resilient means between said lid and said interior lid to normally urge said interior lid into engagement with said reel and said turntable, and an opening in said container adjacent said lip element whereby a clip element can be inserted therethrough at times to engage said lip element to urge said interior lid out of engagement with said reel and said turntable.

10. In an endless tape cartridge, a container having a bottom and side walls, a lid on said container, a turntable rotatably mounted on said container in spaced relation to the bottom thereof, a reel of endless tape on said turntable, a resilient interior lid within said container and mounted in spaced relation over said reel and said turntable, a lip element on said interior lid, said lip element extending upwardly at an angle with respect to the bottom of said container, a resilient means between said lid and said interior lid to normally urge said interior lid into engagement with said reel and said turntable, and an opening in said container adjacent said lip element whereby a clip element can be inserted therethrough at times to engage said lip element to urge said interior lid out of engagement with said reel and said turntable.

11. In combination, a magnetic tape play-back instrument having a clip element thereon, and an endless tape cartridge, comprising, a container having a bottom and side walls, a lid on said container, a turntable rotatably mounted on said container in spaced relation to the bottom thereof, a reel of endless tape on said turntable, a resilient interior lid within said container and mounted in spaced relation over said reel and said turntable, an opening in at least one side of said container, and a resilient means between said lid and said interior lid to normally urge said interior lid into engagement with said reel and said turntable; said clip element penetrating into the opening in said container and engaging said interior lid to disengage said interior lid from said reel and said turntable.

References Cited in the file of this patent

UNITED STATES PATENTS

| | | |
|---|---|---|
| 2,499,895 | Walker | Mar. 7, 1950 |
| 2,778,636 | Eash | Jan. 22, 1957 |
| 2,876,005 | Eash | Mar. 3, 1959 |
| 2,922,642 | Cousino | Jan. 26, 1960 |

OTHER REFERENCES

"Mechanical Brake for Tape Cartridge Recorder," RCA TN No. 252, published June 1959, by the Radio Corporation America.